April 22, 1969 M. A. KNIGHT 3,440,458
ELECTROHYDRODYNAMIC ALTERNATING CURRENT GENERATOR
Filed Jan. 4, 1966 Sheet 1 of 2
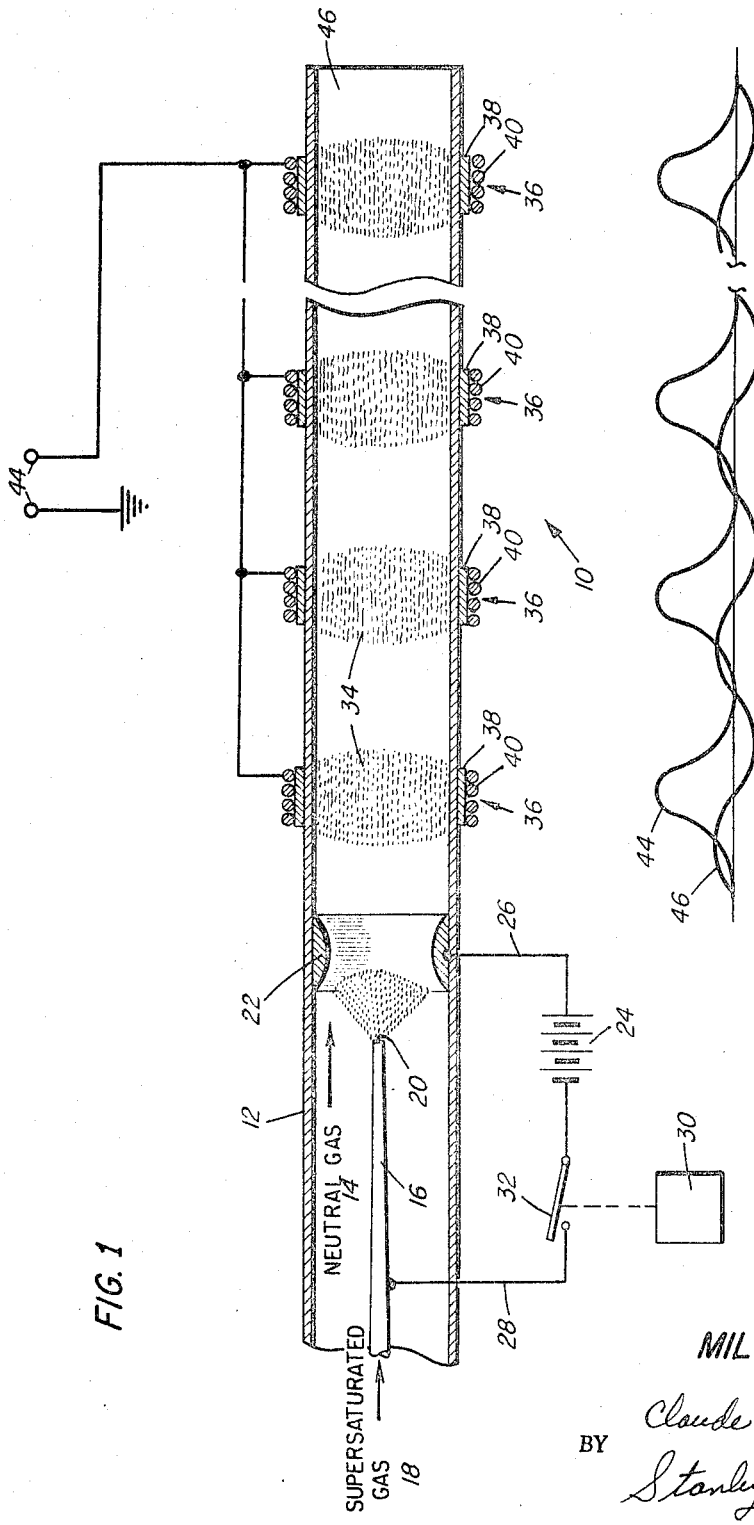
INVENTOR
MILTON A. KNIGHT

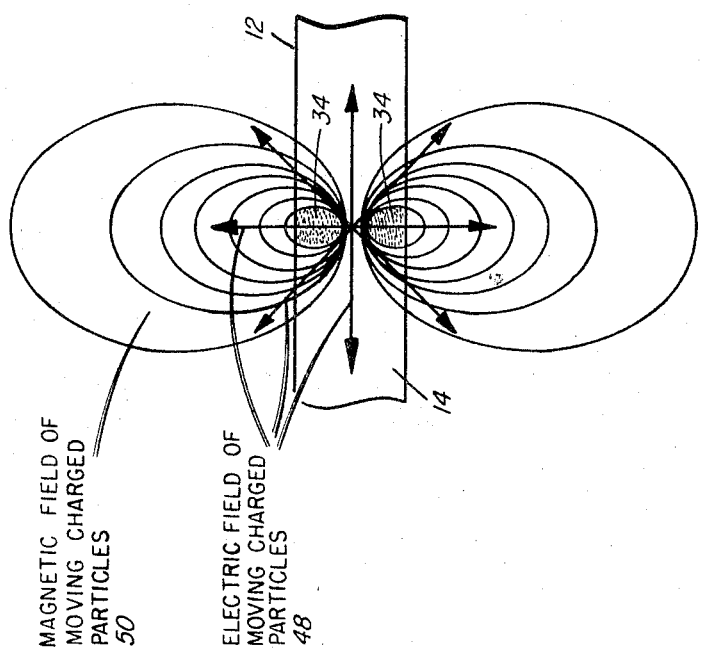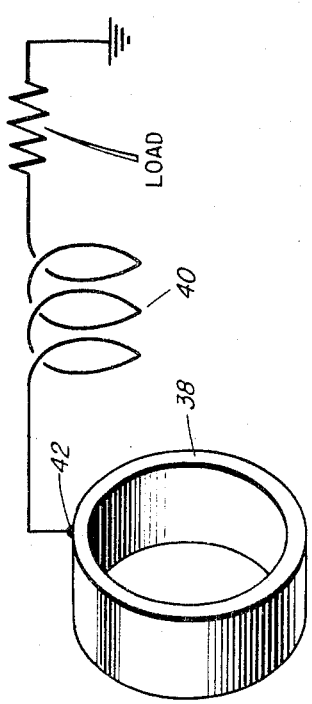

United States Patent Office 3,440,458
Patented Apr. 22, 1969

3,440,458
ELECTROHYDRODYNAMIC ALTERNATING
CURRENT GENERATOR
Milton A. Knight, Box 113, Rte. 1,
Centreville, Va. 22020
Filed Jan. 4, 1966, Ser. No. 518,745
Int. Cl. H02k 45/00
U.S. Cl. 310—11                    8 Claims

ABSTRACT OF THE DISCLOSURE

An electrohydrodynamic alternating current generator wherein a stream of supersaturated gas is passed through an elongated channel, the gas being formed into ionized groups by an oscillator. As the ionized groups pass along the length of the channel they act on a plurality of coils which are wound around the outside of the channel. Electromagnetic flux caused by the ionized gas groups induces a potential in the coils, the coils being connected in parallel to a load.

---

The invention described herein may be manufactured and used by or for the Government of the United States of America for governmental purposes without the payment of any royalties thereon or therefor.

The present invention relates to electric power generating equipment and more particularly to an electrohydrodynamic generator that is adapted to produce alternating current electric power.

Electrohydrodynamic generation differs from conventional magneto-hydrodynamic generation in that, in the former, a magnetic field is produced by a flowing fluid, whereas, in the latter, a magnetic field is produced by a coil or magnet surrounding a fluid conduit.

The most effective present state-of-the-art process for power generation by the use of electrohydrodynamic generators utilizes two gases; a first neutral gas flowing in a channel into which is injected a second supersaturated gas. As the supersaturated gas enters the neutral gas it is expanded and caused to condense into minute particles (0.1 to 2 microns). The point of the tube outlet from which the supersaturated gas enters the moving neutral gas stream is connected to one terminal of a 1000 to 5000 volt electrical potential while a metallic ring forming an inside part of the channel wall slightly downstream from the tube outlet is connected to the other terminal. Since the terminal on the supersaturated gas tube outlet is formed into a sharp point, a corona field is established therearound. Accordingly, as the supersaturated gas condenses, the gas particles become charged but since the neutral gas flow accelerates the charged particles and carries them downstream, no current actually flows between the two terminals. Thus, the ring around the channel wall serves as an ionizer and the terminal at the inner tube furnishes the corona field for charging the particles. Present generators use a collector plate or rod downstream from the ionizer so that the charged particles are carried by their own momentum and by the kinetic energy of the neutral gas stream to the collector where they give up their charge. However, as is well known, when two like charges are brought together, such as the charged particles and the charge already existing on the collector plate, the electric field intensity varies inversely as the square of the distance between the two charges. Thus, considerable work must be expended by the kinetic energy of the moving gas to force the charged particles into the electric field of the collector. This work is provided by the energy of the neutral gas particles colliding with the charged particles, thereby resulting in a transfer of energy. To improve performance, the size of the charged particles is selected to provide low mobility so as to obtain many collisions with the neutral gas, thereby providing the necessary energy to raise the intensity of the collector plate.

There are several major disadvantages with the present charged particle system which have precluded their practical application. First, they are highly inefficient in that only a small amount of the kinetic energy of the neutral gas is transferred to the kinetic energy of the charged particles. Previous work has obtained an efficiency of less than 1 percent against a theoretical efficiency of 50 percent. The reason for this is that the collector plate must be placed so close to the ionizer ring that, with increased density of the charged particles, the gas breaks down electrically and shorts between the collector and the ionizer. Accordingly, low density charging is necessary with resulting low efficiency. The second major disadvantage is that the collector must be placed in the gas flow and, under high velocity gas conditions, this collector provides considerable turbulence and friction loss to the generator. A third disadvantage is that a high voltage direct current output is generated and, as such, is unusable. This output must be converted to alternating or pulsed current and reduced to a usable voltage by an external conversion system. Although, with respect to the last-mentioned disadvantage, there have been developed prior art alternating current generators, these generators have been characterized by mechanical switching means for converting the direct current produced by the generator into alternating current prior to distribution. Such mechanical switching means are inherently unreliable, require considerable maintenance and are expensive to construct.

Accordingly, the general purpose of this invention is to provide an electrohydrodynamic generator which embraces all of the advantages of similarly employed prior art generators and which possesses none of the aforesaid disadvantages. To attain this, the present invention utilizes a unique plasma pulsing system which is used in conjunction with a unique collector assembly to efficiently produce an alternating current output without the need for mechanical switching arrangements.

It is therefore an object of the present invention to provide an electrohydrodynamic generator which produces an alternating current output.

Another object of the present invention is the provision of an electrohydrodynamic generator which produces alternating current at a much higher efficiency than heretofore considered possible.

A further object of the present invention is to provide an electrohydrodynamic generator which produces an alternating current output without utilizing mechanical switching arrangements.

Still another object of the present invention is to provide an electrohydrodynamic generator which is characterized by simplicity of construction, low cost and ease of operation and use.

Other objects, advantages and novel features of the present invention will become apparent from the following detailed description of the invention when considered in conjunction with the accompanying drawings wherein:

FIG. 1 is a side elevation view, partly in section, of a preferred embodiment of the invention;

FIG. 2 is a schematic representation of the collector of the present invention;

FIG. 3 is a diagrammatic view, partly in vertical section, of a portion of the apparatus; and FIG. 4 is a graphic illustration of the voltages produced by the apparatus of the present invention.

In general, the present invention is based upon the concept that considerable power may be concentrated into a small plasma column. In other words, it has been discovered that the coulomb intensity is such that an appreciable magnetic field may be created by a moving mass of charged particles in addition to the ever present electric field. For example, a charged particle density of $10^{14}$ charges per cubic centimeter at a gas flow velocity of 200 meters per second will give a current flow of approximately two coulombs per square centimeter of channel area. The present invention, therefore, makes use of both the magnetic field and electric field of the moving plasma without creating any frictional impediment to the flow of gas, and also utilizes a series of generator conductor coils and rings to fully exploit the kinetic energy of the gas. Of course, in order to make use of the magnetic field of the plasma, the field must be made to pulse. This is accomplished by oscillating the electric field at the ionizer so as to provide pulses of charged particles separated by short spaces of neutral gas.

Referring now to the drawings wherein like reference characters designate like or corresponding parts throughout the several views, there is shown in FIG. 1 an electrohydrodynamic generator, generally indicated by reference character 10, comprised of a duct or conduit 12 through which a pressurized neutral gas 14 is caused to flow. A second conduit or tube 16 having a truncated conical configuration is concentrically disposed within the outer duct 12 at the inlet end thereof. A supersaturated gas 18 is introduced into the neutral gas via the conduit 16 at the outlet 20. An annular ionizer ring 22 is disposed in the channel slightly downstream from the opening 20 of the supersaturated gas tube 16 and an electrical potential, generally indicated by a battery 24 and electrical conductors 26, 28, is connected across the ionizer ring 22 and the supersaturated gas tube 16. This potential is controlled by an ionizer oscillator 30 which, in the embodiment illustrated, controls a switching mechanism 32 in the conductor 28. Of course, it should be understood that any type of conventional pulsing equipment may be used in place of the ionizer oscillator 30 and the mechanical switching means 32. For example, the mechanical switching means 32 may be completely eliminated and replaced by either a vacuum tube or a solid state switching device which is well known in the art. As is apparent, when the terminals 20, 22 are charged, a corona will form at the opening 20 of the supersaturated gas tube 16 and the gas emitting therefrom will be condensed and the particles charged. Since the pulses are of short duration, the charged particles will form in bunches as illustrated at 34 and be caused to move downstream accelerated by the kinetic energy of the neutral gas 14. By the use of this system, a very high density of charged particles is permissible.

Disposed downstream from the ionizer ring 22 is a plurality of spaced collector means 36. As best illustrated in FIGS. 1 and 2, each of the collector means 36 is comprised of a collector ring 38 having multiple turns of a conductor wire 40 wrapped therearound with one end of the conductor wire 40 electrically connected to the ring 38, as illustrated at 42. Each of the collector assemblies 36 may then be connected together in a conventional manner to produce either a single phase or a three-phase alternating current output. For example, as illustrated in FIG. 1, the collector assemblies 36 are all connected in parallel to produce a single phase alternating current output at 44. The downstream end of the duct 12 may be opened as at 46 to atmosphere so that the neutral gas and the groups of charged particles 34 are exhausted. Alternatively, a closed loop may be provided for returning the gases back to the inlet side of the conduit 12. In the latter alternative means such as a gas pump must be utilized to increase the pressure and velocity of the gases prior to recirculation.

The operation of the invention will now be described. A neutral gas 14 is admitted into the inlet of the conduit 12 and a supersaturated gas 18 admitted into the inner duct 16 so that the supersaturated gas 18 condenses at the exit 20 of the inner duct 16 and is carried along the length of the tube by the neutral gas 14. A voltage source 24 applied across the inner duct 16 and the ionizer ring 22 causes a corona to form at the exit 20 of the inner duct 16, thereby ionizing the gas 18. Since the voltage source 20 is pulsed by an oscillator 30 and switching means 32, the ionized charged particles form in groups as illustrated at 34. When the field of a group of charged particles 34 approaches a collector assembly, two separate and assisting voltages are induced therein. The electric field of the particles builds up an induced voltage varying inversely as the square of the distance between the charges 34 and the ring collector 38. This voltage will increase until the group of charged particles 34 is directly beneath the collector 36 and will thereafter decrease until another group of charged particles approaches within inductive range. The magnetic field of the charged particles approaching the conductor coils 40 will cut these coils and induce a voltage therein. The voltage will increase to a maximum and then fall to zero as the center of the charged particle mass is directly beneath the coil since, at this point, no lines of force are being cut. As the center of the mass moves away, the voltage again builds up to a maximum in the opposite direction and then returns to zero.

As illustrated in FIGS. 3 and 4, the voltage 44 induced by the electric field 48 and the voltage 46 induced by the magnetic field 50 assist one another in increasing the efficiency of the generator. This is accomplished for the following reasons. As the negatively charged electric field 34 approaches the ring collector 38, it repulses electrons in the ring collector which flow away to ground through the collector coils leaving the ring collector in a highly positive charged state. The magnetic field voltage induced in the collector coils 40 assists this flow of current. Then as the negative charged electric field 34 moves away from the collector assembly 36, the charges in the collector ring 38 will neutralize, i.e., the electrons will return back from ground through the conductor coils 40 to the conductor ring 38. The reversal of the voltage induced in the conductor coils 40 by the magnetic field 50 expedites the flow of electrons back to the conductor ring 38.

Since it is known that all of the kinetic energy of the neutral gas 14 will not be expended in pushing the charged particles 34 past one set of the collector assemblies, a series of collector assemblies 36 are mounted around the channel 12 at spaced intervals so that the voltages induced will synchronize, with each collector assembly extracting a portion of the total kinetic energy of the gas. As shown in FIG. 1, the collectors can be connected in parallel for single phase alternating current power. Alternatively, the collectors may be connected in a conventional manner (not shown) so as to provide three-phase alternating current power. The frequency of the output power can be regulated by controlling the frequency of the ionizer oscillator 30.

There has been described a charged particle alternating current generating system which is capable of producing alternating current at a higher efficiency than heretofore thought possible. This system permits maximum charged particles density in the channel and, by the use of both electric and magnetic field collectors, converts a maximum amount of the kinetic energy of the gas into electric power. Furthermore, since there are no obstructions in the channel, frictional losses are minimized.

Obviously many modifications and variations of the present invention are possible in the light of the above teachings. It is therefore to be understood that within the scope of the appended claims the invention may be practiced otherwise than as specifically described.

What is claimed is:
1. An electrohydrodynamic generator comprising:
 a conduit;
 a truncated conical tube concentrically disposed within and terminating near the inlet end of said conduit for producing a flow of gas through said conduit;

an annular ionizer ring disposed within said conduit slightly downstream from the exit end of said conical tube for ionizing the gas, said ionizer ring and conical tube having a voltage potential connected thereacross; and means circumscribing said conduit for generating an alternating electric current in response to the passage of said gas through said conduit.

2. An electrohydrodynamic generator in accordance with claim 1 wherein said means for intermittently pulsing said ionizing means comprises:

an electrical oscillator; and switching means responsive to said oscillator serially connected between said voltage potential and said conical tube.

3. An electrohydrodynamic generator in accordance with claim 2 wherein said means circumscribing said conduit for generating an alternating current comprises:

an annular collector ring responsive to the electric field produced by said ionized gas; and an annular conductor coil responsive to the magnetic field produced by said ionized gas.

4. An electrohydrodynamic generator in accordance with claim 3 wherein:

said annular conductor coil is wrapped around said annular collector ring with one end of said conductor coil being electrically connected to said collector ring.

5. An electrohydrodynamic generator in accordance with claim 4 wherein:

a plurality of said annular collector ring and conductor coil assemblies are disposed at spaced intervals along a portion of the length of said conduit, said assemblies being electrically connected to each other and to a load device.

6. An electrohydrodynamic generator in accordance with claim 1 wherein said means circumscribing said conduit for generating an alternating current comprises:

an annular collector ring having an annular conductor coil wrapped therearound with one end of said conductor coil being electrically connected to said collector ring.

7. An electrohydrodynamic generator in accordance with claim 6 wherein:

a plurality of said collector ring and conductor coil assemblies are disposed at spaced intervals along a portion of the length of said conduit.

8. A method of generating an alternating current utilizing the structure defined in claim 1 comprising:

introducing a pressurized neutral gas and a supersaturated gas into the conduit;

condensing the supersaturated gas;

intermittently ionizing said condensed gas; and generating an alternating electric current in response to the passage of said ionized gas through said conduit.

References Cited

UNITED STATES PATENTS

| | | | |
|---|---|---|---|
| 3,080,515 | 3/1963 | Kehoe | 310—11 |
| 3,201,622 | 8/1965 | Thring | 310—11 |
| 3,327,223 | 6/1967 | Halista | 310—11 |
| 3,363,120 | 1/1968 | Ricateau et al. | 310—11 |

DAVID X. SLINEY, *Primary Examiner.*

U.S. Cl. X.R.

310—5